United States Patent
Awfi

(10) Patent No.: US 11,022,710 B2
(45) Date of Patent: Jun. 1, 2021

(54) IDENTIFYING ANOMALIES IN A SUBTERRANEAN FORMATION BASED ON SEISMIC ATTRIBUTES

(71) Applicant: Saudi Arabian Oil Company, Dhahran (SA)

(72) Inventor: Sami N. Awfi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 116 days.

(21) Appl. No.: 16/429,361

(22) Filed: Jun. 3, 2019

(65) Prior Publication Data
US 2020/0379137 A1 Dec. 3, 2020

(51) Int. Cl.
*G01V 1/30* (2006.01)
*G01V 1/34* (2006.01)

(52) U.S. Cl.
CPC .............. *G01V 1/307* (2013.01); *G01V 1/345* (2013.01)

(58) Field of Classification Search
CPC .......... G01V 1/307; G01V 1/345; G01V 1/34; G01V 2210/63
See application file for complete search history.

(56) References Cited

U.S. PATENT DOCUMENTS 6,131,071 A * 10/2000 Partyka ................. G01V 1/301
702/16
2012/0090834 A1 4/2012 Imhof et al.
2012/0150447 A1 6/2012 Van Hoek et al.
2013/0338927 A1 12/2013 Kumaran
2018/0003839 A1 1/2018 Lowell et al.
2020/0257011 A1* 8/2020 Awfi ..................... G01V 1/306

OTHER PUBLICATIONS

Brown, "Sesmic attributes and their classification," The Leading Edge, vol. 15, Issue 10, p. 1090, Oct. 1996, 1 page.
Chopra and Mafurt, "Emerging and future trends in seismic attributes," The Leading Edge, vol. 27, Issue 3, pp. 298-318, Mar. 2008, 16 pages.
Chopra and Marfurt, "Sesimic attributes—A historical perspective," Geophysics, vol. 70, Issue 5, pp. 3SO-28SO, Sep. 2005, 26 pages.
Dirstein et al., "Insights from the Automated Extraction of Surfaces from the Bunda 3D Seismic Survey", West Australian Basins Symposium, Aug. 2013, 21 pages.

(Continued)

*Primary Examiner* — Toan M Le
(74) *Attorney, Agent, or Firm* — Fish & Richardson P.C.

(57) ABSTRACT

Systems and methods for identifying anomalies in a subterranean formation based on seismic attributes include: receiving a seismic cube and a seismic surface, wherein the seismic cube includes traces recorded at receivers deployed to collect seismic data, and the seismic surface is picked on the seismic cube; extracting seismic wavelets with a selected length from the seismic cube along an intersection with the seismic surface for each spatial coordinate associated with the seismic surface; determining a population trend of the seismic wavelets; and generating a attribute map based on comparing each of the seismic wavelets to the population trend.

22 Claims, 15 Drawing Sheets
(2 of 15 Drawing Sheet(s) Filed in Color)

(56) References Cited

OTHER PUBLICATIONS

Hills et al., "Searching for Similarity in a Slab of Seismic Data", The Leading Edge, Society of Exploration Geophysicists, vol. 25, No. 2, Feb. 2006, 168-170, 172-177, 8 pages.
Nasseri et al., "Fracture enhancement based on artificial ants and fuzzy c-means clustering (FCMC) in Dezful Embayment of Iran", Journal of Geophysics and Engineering, Institute of Physics Publishing, vol. 12, No. 2, Mar. 2015, 227-241, 15 pages.
PCT International Search Report and Written Opinion in International Application No. PCT/US2020/034,893, dated Sep. 15, 2020, 14 pages.

* cited by examiner

IDENTIFYING ANOMALIES IN A SUBTERRANEAN FORMATION BASED ON SEISMIC ATTRIBUTES

TECHNICAL FIELD

The present disclosure generally relates to systems and methods for exploring for hydrocarbons.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications such as, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources such as, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This specification describes systems and methods for identifying anomalies in a subterranean formation based on seismic attributes. These systems and methods can generate a custom seismic surface (2D) and volume (3D) attribute that are useful in seismic exploration for hydrocarbons. This attribute provides a measure to quantify how anomalous the seismic response in a given location is compared to the rest of the area of interest. This quantification is a spatially global measure (not local) which highlights stratigraphic features and helps the interpreter identify and interpret them. These stratigraphic features includes channels, faults and other anomalous features such as gas accumulation locations. The ability to detect these kinds of anomalies can be very valuable in hydrocarbon exploration process because they can harbor stratigraphically trapped hydrocarbons.

Some methods for identifying anomalies in a subterranean formation based on seismic attributes include: receiving a seismic cube and a seismic surface, wherein the seismic cube includes traces recorded at receivers deployed to collect seismic data, and the seismic surface is picked on the seismic cube; extracting seismic wavelets with a selected length from the seismic cube along an intersection with the seismic surface for each spatial coordinate associated with the seismic surface; determining a population trend of the seismic wavelets; and generating a attribute map based on comparing each of the seismic wavelets to the population trend.

In some aspects, one or more non-transitory computer-readable storage media coupled to one or more processors and having instructions stored thereon which, when executed by the one or more processors, cause the one or more processors to: receive a seismic cube and a seismic surface, wherein the seismic cube includes traces recorded at receivers deployed to collect seismic data, and the seismic surface is picked on the seismic cube; extract seismic wavelets with a selected length from the seismic cube along an intersection with the seismic surface for each spatial coordinate associated with the seismic surface; determine a population trend of the seismic wavelets; and generate a attribute map based on comparing each of the seismic wavelets to the population trend.

Embodiments of these systems and methods can include one or more of the following features.

In some embodiments, methods also include determining weights for each of 2D slice or sample of the wavelets, wherein the wavelets are extracted using the weights.

In some embodiments, methods also include, before extracting the wavelets, determining a wavelet length for the selected seismic cube, wherein the wavelet length represents a number of genes in each of the extracted wavelets. In some cases, the wavelet length is the same for each of the extracted wavelets. In some cases, methods also include selecting a parameter reference for the weight function to give weights to each of the genes. The parameter reference can be between 0.1 and 0.99.

In some cases, the attribute map displays an abnormality measure. In some cases, the abnormality measure is generated by comparing each gene in a given wavelet to a corresponding gene in the population trend. In some cases, methods also include calculating wavelet energy modified by the weights and energy of the population trend modified by the weights. In some cases, methods also include decreasing the abnormality measure if the current wavelet energy is less than the energy of the population trend and increasing the abnormality measure if the current wavelet energy is more than the energy of the population trend. In some cases, In some cases, methods also include normalizing the abnormality measure by a spread of each sample across the population of wavelets. In some cases, calculation of the abnormality measure comprises multiplication by Sign(nR).

In some embodiments, methods also include evaluating a productivity of the seismic surface using the surface attribute map.

The disclosed systems and methods provide many advantages in hydrocarbon exploration using seismic surveying by allowing high quality mapping of anomalous seismic responses. Mapping anomalies in seismic response along a given surface often directly indicates the presence of hydrocarbons (especially gas accumulations) in the formation. Anomalies also sometimes indicate interesting geological features such as channels and sand bodies which often score high in permeability and porosity making them able to harbor hydrocarbon and thus targets in the exploration process. Using these systems and methods allows for the discovery and mapping of geological bodies that can harbor hydrocarbons. The way these systems and methods generate anomalies maps is unique and of high quality and often it shows geological features not easily visible in original seismic input or using other attributes.

The details of one or more embodiments of these systems and methods are set forth in the accompanying drawings and the description to be presented. Other features, objects, and advantages of these systems and methods will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

This specification describes systems and methods for identifying anomalies in a subterranean formation based on seismic attributes. These systems and methods can generate a custom seismic surface (2D) and volume (3D) attribute that are useful in seismic exploration for hydrocarbons. This attribute provides a measure to quantify how anomalous the seismic response in a given location is compared to the rest of the area of interest. This quantification is a spatially global measure (not local) which highlights stratigraphic features and helps the interpreter identify and interpret them. These stratigraphic features includes channels, faults and other anomalous features such as gas accumulation locations. The ability to detect these kinds of anomalies can be very valuable in hydrocarbon exploration process because they can harbor stratigraphically trapped hydrocarbons.

Figure 1:
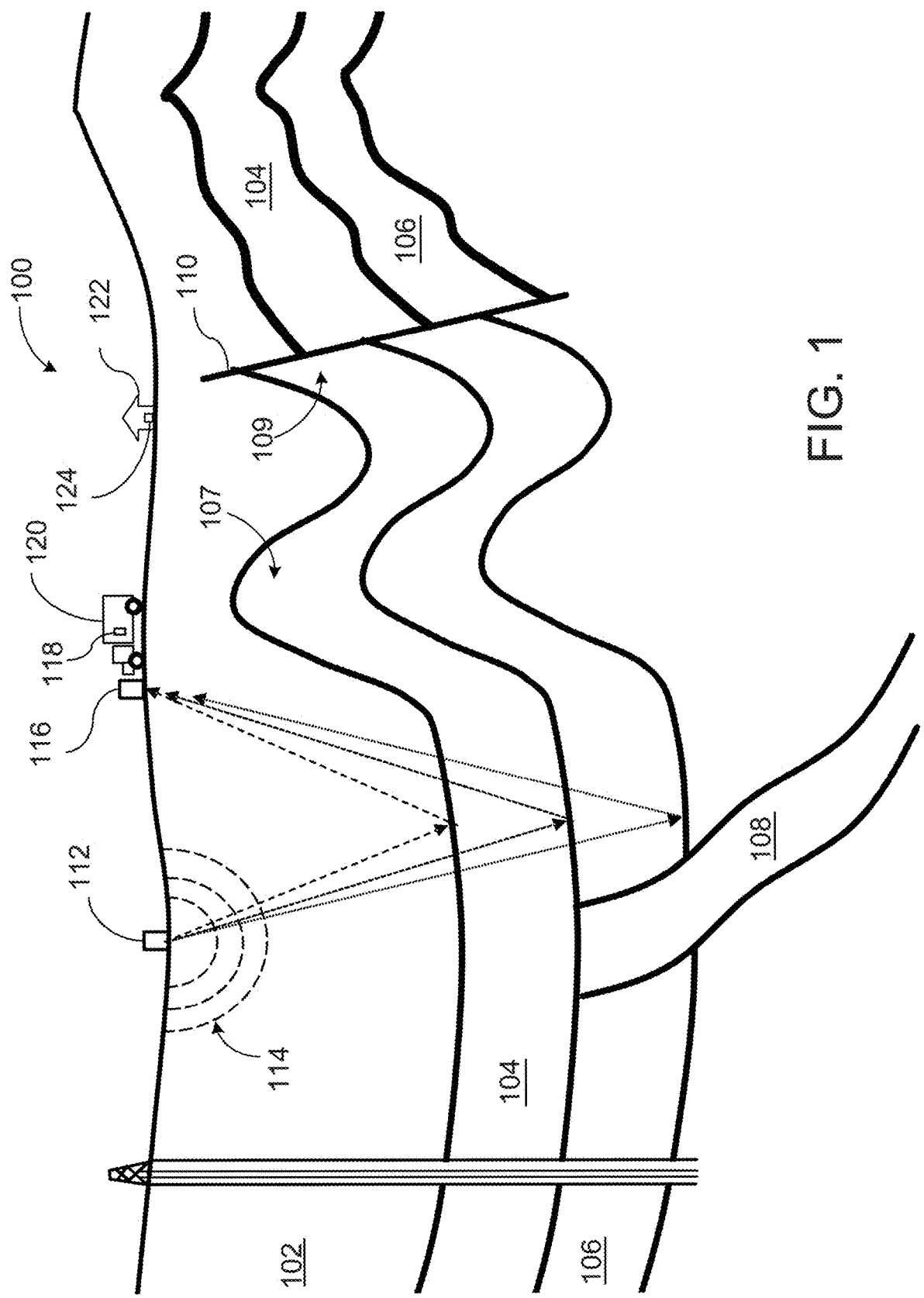
FIG. 1 is a schematic view of a seismic survey being performed to map subterranean features such as facies and faults.

FIG. 1 is a schematic view of a seismic survey being performed to map subterranean features such as facies and faults in a subterranean formation 100. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

A seismic source 112 (for example, a seismic vibrator or an explosion) generates seismic waves 114 that propagate in the earth. The velocity of these seismic waves depends properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, each interface reflects some of the energy of the seismic wave and refracts part of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output such as, for example, a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing represent the subterranean formation 100. The seismic cube can also be display results of the analysis of the seismic data associated with the seismic survey.

Figure 2:
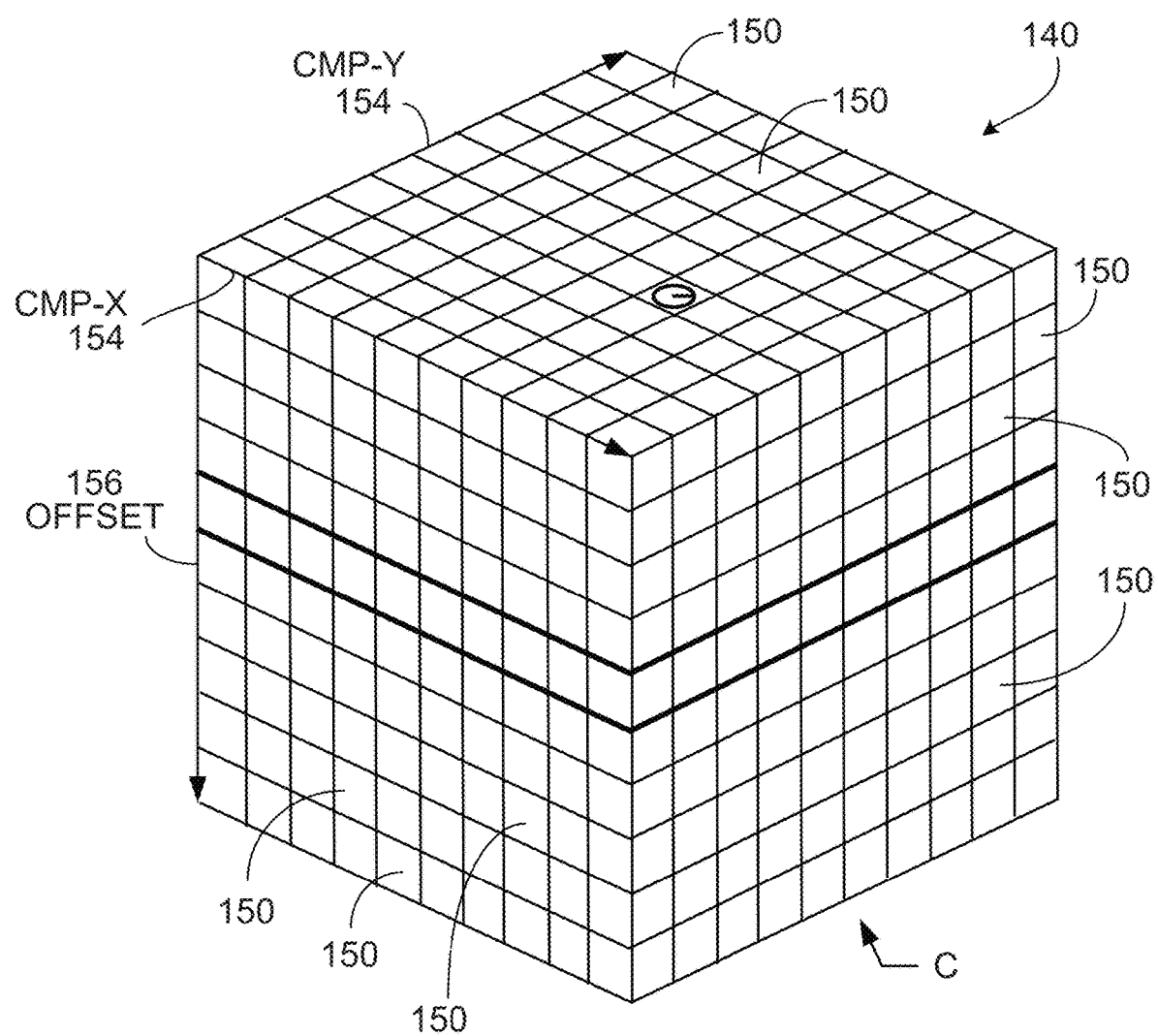
FIG. 2 illustrates a three-dimensional representation of the subterranean region where the seismic survey was performed.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a Delta-X offset spacing 152, a Delta-Y offset spacing 154, and a Delta-Offset offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
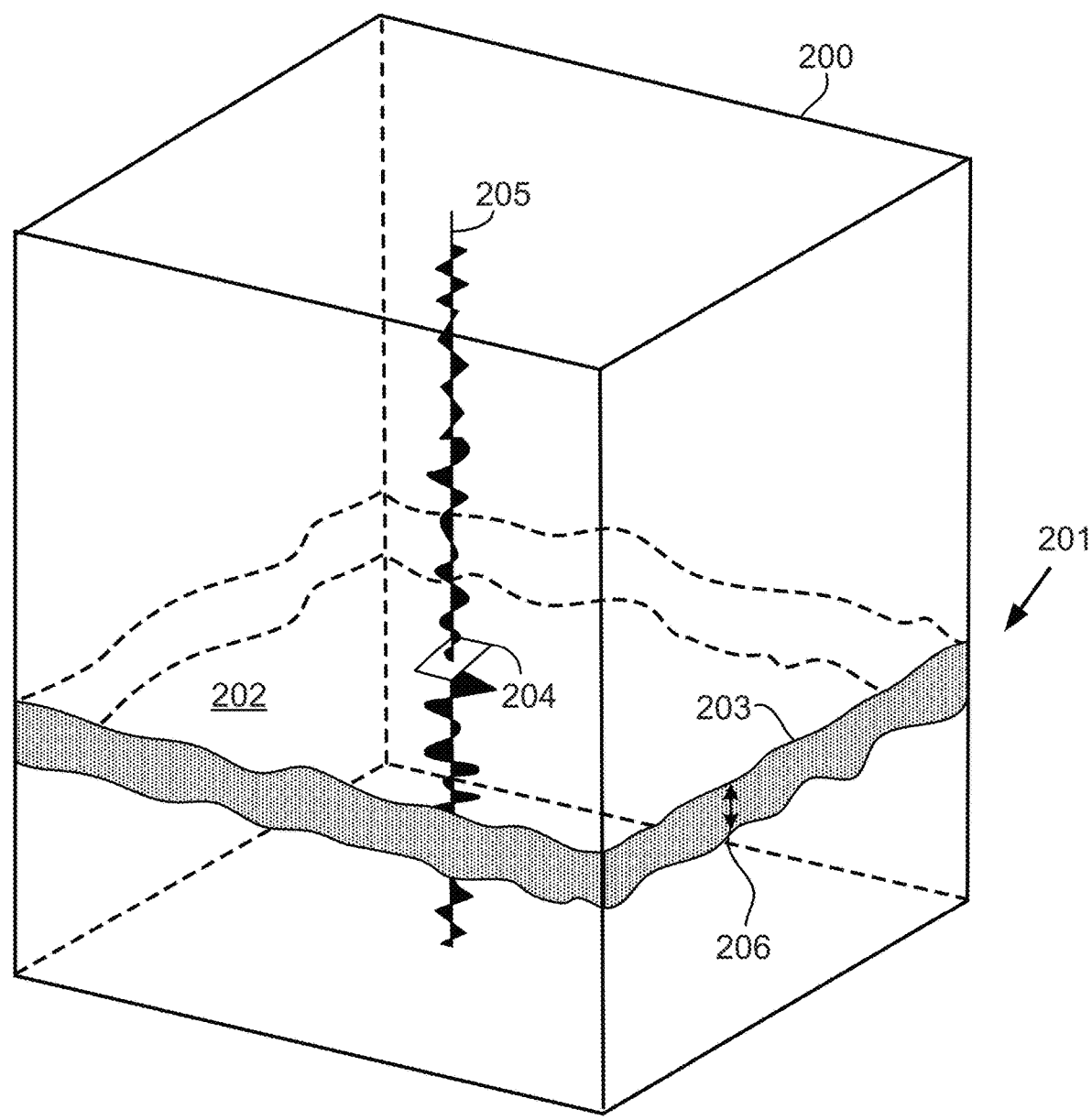
FIG. 3 illustrates a stratigraphic trace within a formation.

FIG. 3 illustrates a seismic cube 200 representing a formation. The seismic cube has a stratum 201 based on a surface (for example, an amplitude surface 202) and a stratigraphic horizon 203. The amplitude surface 202 and the stratigraphic horizon 203 are grids that include many cells such as exemplary cell 204. Each cell is a sample of a seismic trace representing an acoustic wave. Each seismic trace has an x-coordinate and a y-coordinate, and each data point of the trace corresponds to a certain seismic travel time or depth (t or z). For the stratigraphic horizon 203, a time value is determined and then assigned to the cells from the stratum 201. For the amplitude surface 202, the amplitude value of the seismic trace at the time of the corresponding horizon is assigned to the cell. This assignment process is repeated for all of the cells on this horizon to generate the amplitude surface 202 for the stratum 201. In some instances, the amplitude values of the seismic trace 205 within window 206 by horizon 203 are combined to generate a compound amplitude value for stratum 201. In these instances, the compound amplitude value can be the arithmetic mean of the positive amplitudes within the duration of the window, multiplied by the number of seismic samples in the window.

Figure 4C:
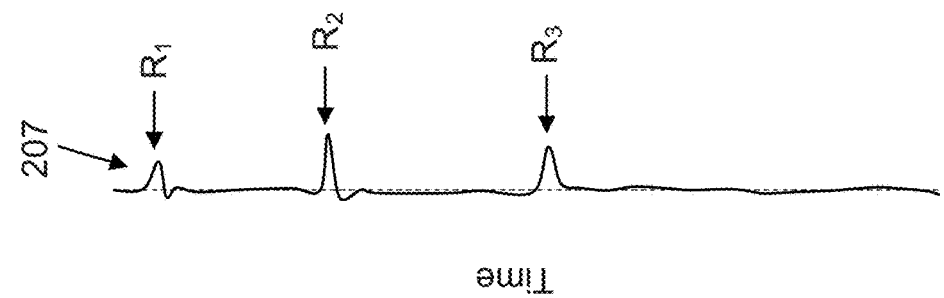
FIGS. 4A, 4B, and 4C schematically illustrate the process stacking a group of seismic traces to improve the signal to noise ratio of the traces.
Figure 4B:
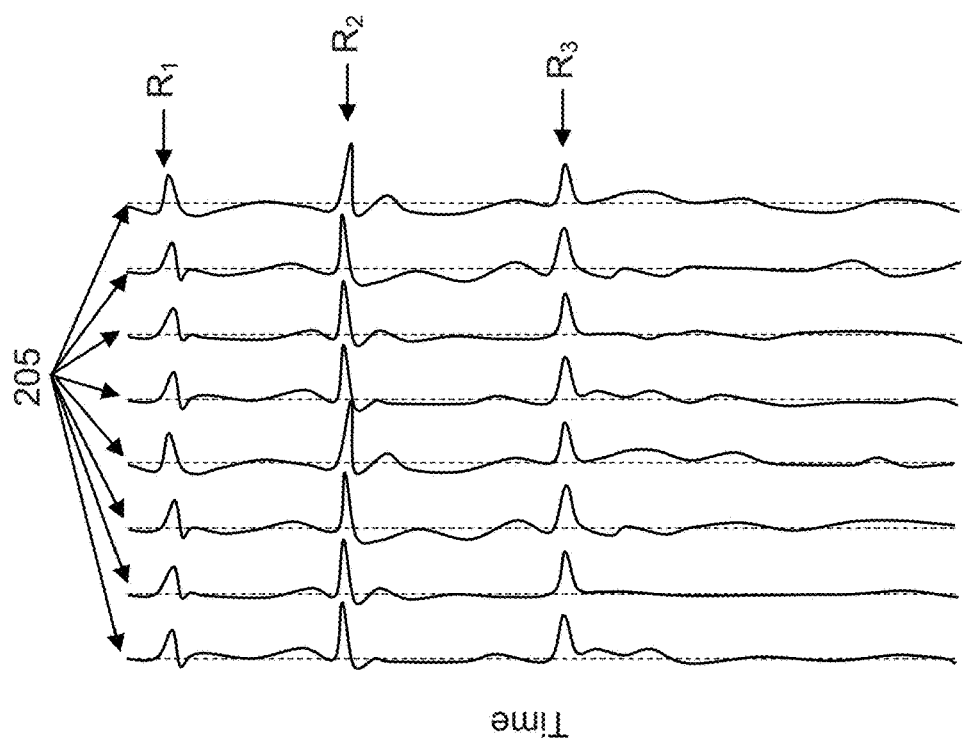
Figure 4A:
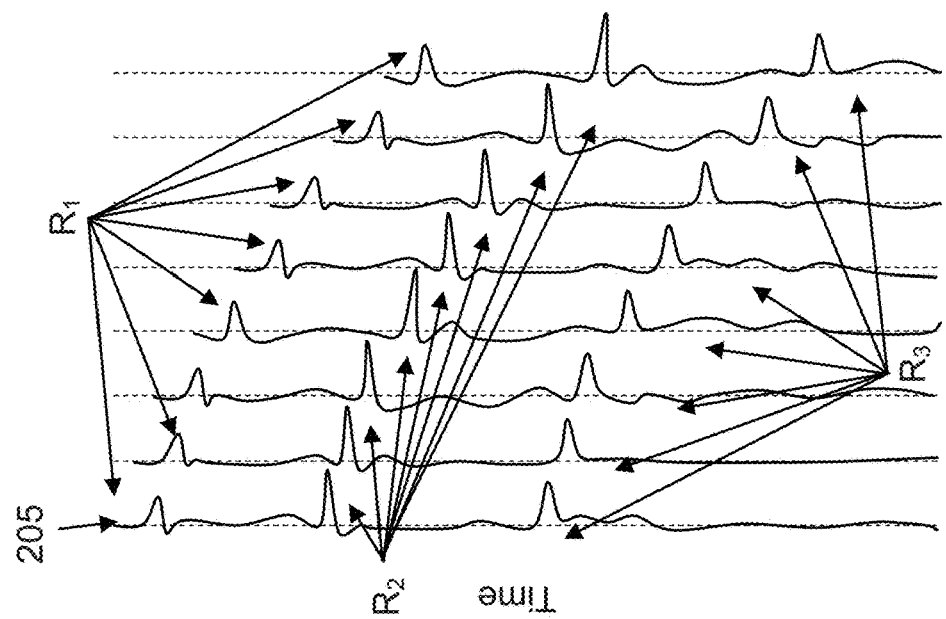

FIGS. 4A, 4B, and 4C schematically illustrate the process stacking a group of seismic traces 205 to improve the signal to noise ratio of the traces. FIG. 4A illustrates a common midpoint (CMP) gather of eight traces 205 generated by a set of sources and sensors that share a common midpoint. For ease of explanation, the traces are assumed to have been generated by reflections from three horizontal horizons.

The traces 205 are arranged with increasing offset from the CMP. The offset of the traces 205 from the CMP increase from left to right and the reflection time increases from top to bottom. Increasing offset from the common midpoint increases the angle of a seismic wave that between a source and a sensor, increases the distance the wave travels between the source and the sensor, and increases the slant reflection time. The increasing time for the reflections ($R_1$, $R_2$, $R_3$) from each of the horizons to arrive for source-sensor pairs with increasing offsets from the CMP reflects this increased slant time.

FIG. 4B shows the traces 205 after normal moveout (NMO) correction. NMO is the difference between vertical reflection time and the slant reflection time for a given source-sensor pair. This correction places reflections ($R_1$, $R_2$, $R_3$) from common horizons at the same arrival time. The NMO correction is a function of the vertical reflection time for a specific horizon, the offset of a specific source-sensor pair, and the velocity of the seismic wave in the subterranean formation. The vertical reflection time for a specific horizon and the offset of for a specific source-sensor pair are known parameters for each trace. However, the velocity is usually not readily available. As previously discussed, the velocity of seismic waves depends properties such as, for example, density, porosity, and fluid content of the medium through which the seismic waves are traveling and consequently varies with location in the subterranean formation being studied.

FIG. 4C shows a stack trace 207 generated by summing the traces 205 of the CMP gather and dividing the resulting amplitudes by the number of traces in the gather. The number of traces in the gather is also referred to as the fold of the gather. The noise tends to cancel out and the reflections ($R_1$, $R_2$, $R_3$) from the horizons of the subterranean formation are enhanced.

Figure 5:
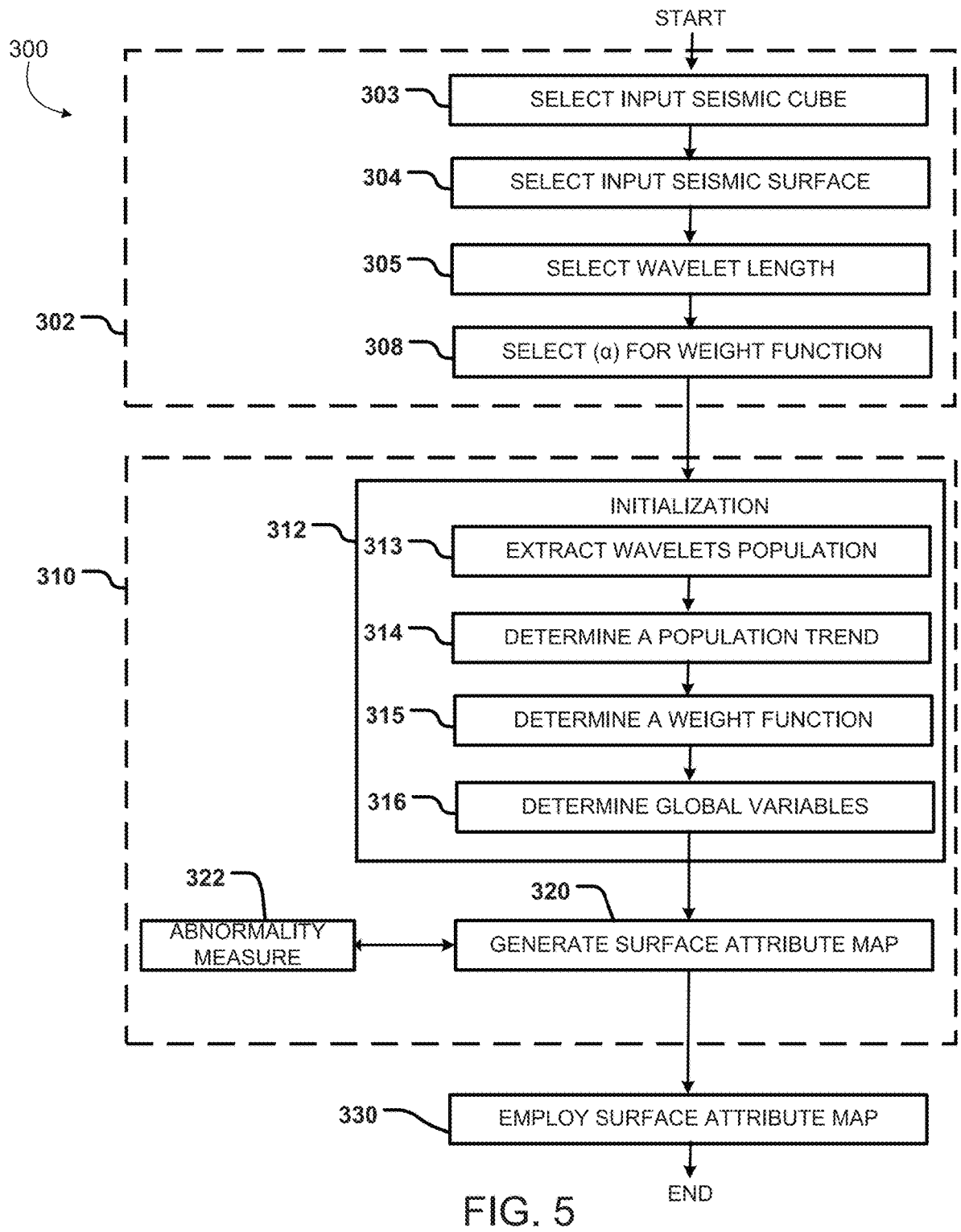
FIG. 5 depicts a flow diagram of an example process employed to calculate a surface attribute map.
Figure 6:
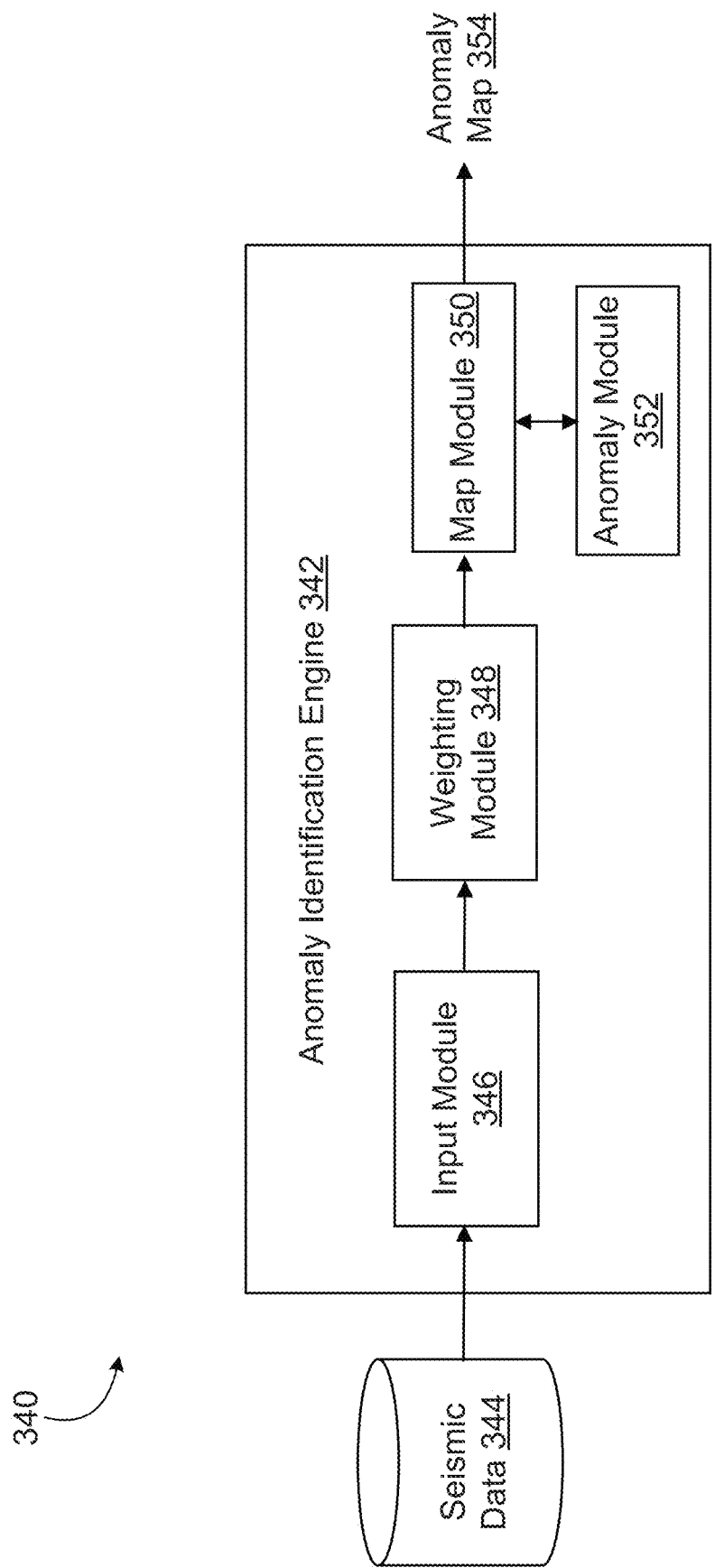
FIG. 6 is a block diagram of an example system implementing the process of FIG. 5.

FIG. 5 depicts a flow diagram of an example process 300 employed to calculate a surface attribute map identifying anomalies in a subterranean formation based on seismic attributes represented by seismic traces. FIG. 6 depicts an example system 340 that can be used to implement the process 300. The system 340 includes an anomaly identification engine 342 that receives data from a database storing seismic data 343 and operator input.

In general, a surface attribute is a number calculated for each X and Y location. Since each X and Y location has a single number, a two-dimensional (2D) array of numbers or a 2D map is produced. In this case, the map can give information about how anomalous the seismic response is in each X, Y location. Generally, the attribute parameters are obtained/generated and provided to anomaly identification engine 342 (see FIG. 6) at step 302. These parameters are provided for attribute computation 310 to generate the surface attribute map, which can then be employed at 338 as described later. The selection steps 303-308 are included in the generation of attribute parameters step 302 by the input module 346 (see FIG. 6), while the initialization step 312 as well as steps 320 and 322 are included in the attribute computation step 310.

At step 303, a 3D seismic data set (seismic cube) is selected as input for the attribute contribution step 310. In some implementations, a seismic cube includes various traces recorded at receivers deployed to collect seismic data. A seismic trace is the sound recorded by a given receiver as one-dimensional (1D) samples of amplitude versus time during seismic surveying. The seismic cube consists of many traces usually collected in a regular gridded interval spatially in X and Y making the seismic cube a 3D array of numbers.

At 304, the surface pick (seismic surface) is selected as input for the attribute contribution step 310. In some implementations, a seismic surface is a 2D surface in a 3D space. This means every X and Y location has a single Z value but this Z value does not need to be constant for every X and Y as a surface can go up and down as shown in FIG. 1. A seismic surface is picked on a seismic cube to track a layer of a specific geological age across the formation.

At 306, wavelet length (for example, the number of samples or genes) is determined for the selected seismic cube and provided as input to the contribution step 310. The wavelet length is the number of samples above+number of samples below+1. The wavelet length is the same of all wavelets and is selected at the beginning by the user (or a default value) but once selected does not change subsequently during the running of the algorithm. In some implementations, the wavelet length is the same for all extracted wavelets and is determined automatically. The wavelet length may also be overridden by an interpreter if needed. As an example, the automatic determination of wavelet length may assume a 40 microsecond (ms) long wavelet centered on a surface. For example, for seismic data with a 4 ms sampling interval, the wavelet may be 11 samples (or genes) long with 5 samples above the surface, 5 samples below the surface and 1 sample on the surface. This can be overridden by an interpreter to change the length or the start and end of the wavelet depending on the purpose or other available information. For example, the interpreter can make the wavelet 11 samples below the surface with no samples above if the phase of the source wavelet is known. The interpreter may also elect to make the wavelet shorter to, for example, produce high vertical resolution or longer to produce, for example, low vertical resolution result.

At 308, a parameter reference is selected as ($\alpha$) for a weight function and can be employed to give weight to each of the genes. In some implementations, the single parameter ($\alpha$) weight function has a single parameter reference as ($\alpha$) that ranges from 0.1 to 0.99 with a recommended default settings of $\alpha$=0.2.

At 310, computation is performed on the selected attributes (inputs) to generate a surface attribute map. As described previously, the attribute computation step 310 includes steps 312, 320, and 322.

At 312, because these variables do not change from one wavelet to another, but rather depend on the initialization parameters and a reference wavelet, they may be pre-computed in initialization step 312 by the weighting module 348 (see FIG. 6). As depicted, the initialization step 312 includes steps 313-316.

At 313, the wavelets are extracted from the seismic cube along the picked surface (plane) for each spatial coordinate within the plane. In some implementations, the plane may be defined according to a coordinate system in which the special coordinates of a point are defined according its distances from a set of perpendicular lines (for example, defined as x and y) that intersect at an origin. For example, the spatial coordinates may be defined according to the perpendicular lines, inline and crossline, where inline refers to the direction in which receiver cables used to collected seismic data (for example, through a series of attached receivers) are deployed and crossline refers to the direction that is perpendicular to the orientation of the receiver cables. In some examples, a wavelet is a one-dimensional pulse that is typically the basic response from a single reflector. Each wavelet includes a number of attributes, which may include the wavelet's amplitude, frequency and phase. In some examples, a wavelet originates as a packet of energy from a source point and has a specific origin in time. A wavelet can be returned to the receivers as a series of events distributed in time and energy. This distribution is a function of velocity and density changes in the subsurface and the relative position of the source and receiver. The energy that returns cannot exceed the energy that was input, thus the energy in any received wavelet decays with time as more partitioning takes place at interfaces. Wavelets also decay due to the loss of energy as heat during propagation. This is more extensive at high frequency, so wavelets tend to contain less high-frequency energy relative to low frequencies at longer travel times. Some wavelets are known by their shape and spectral content, such as the Ricker wavelet.

Figure 7A:
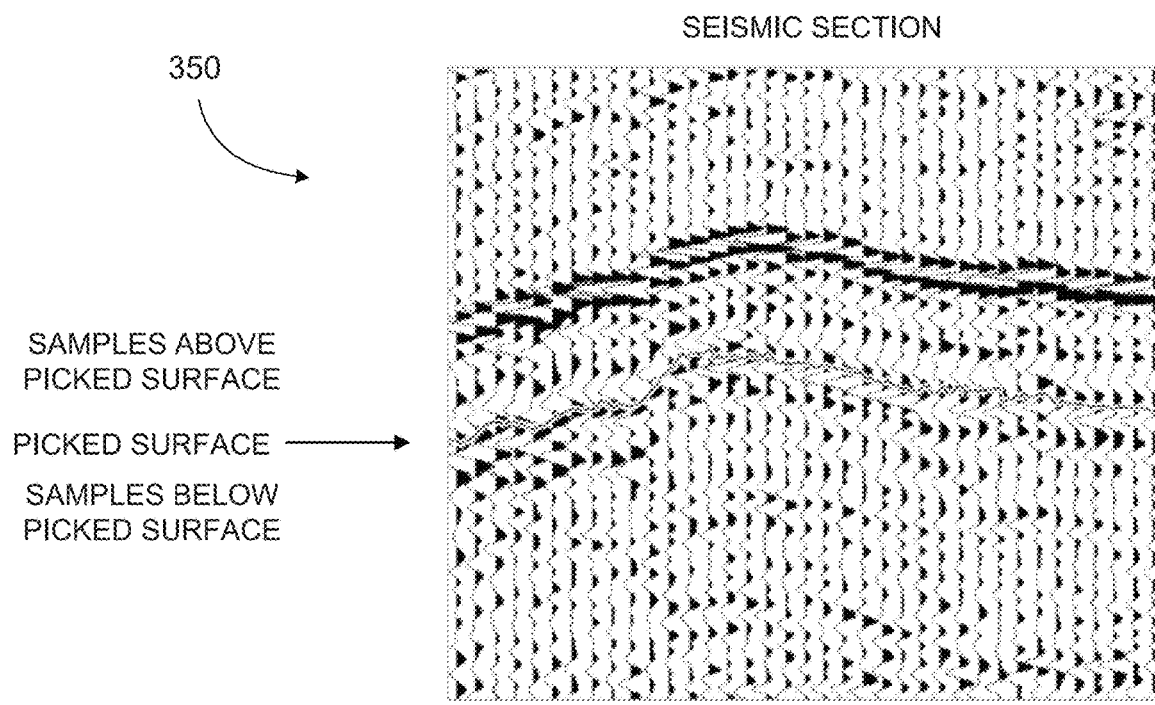
FIG. 7A depicts an example seismic section.
Figure 7B:
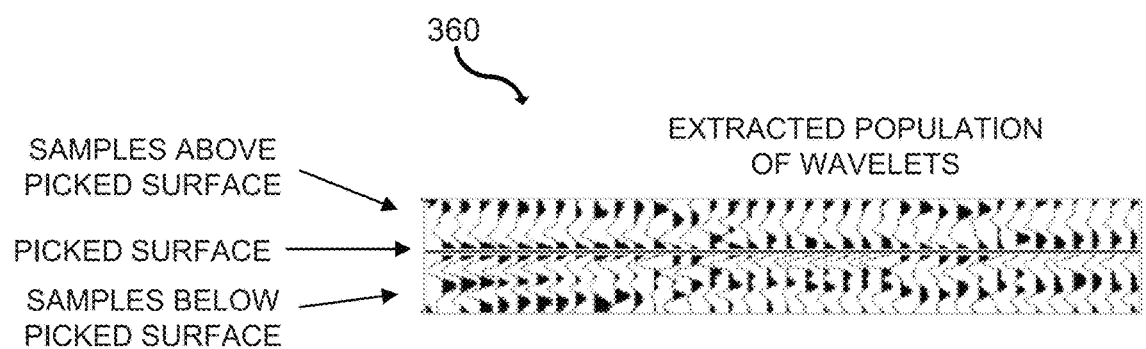
FIG. 7B depicts an extracted population of wavelets.
Figure 8:
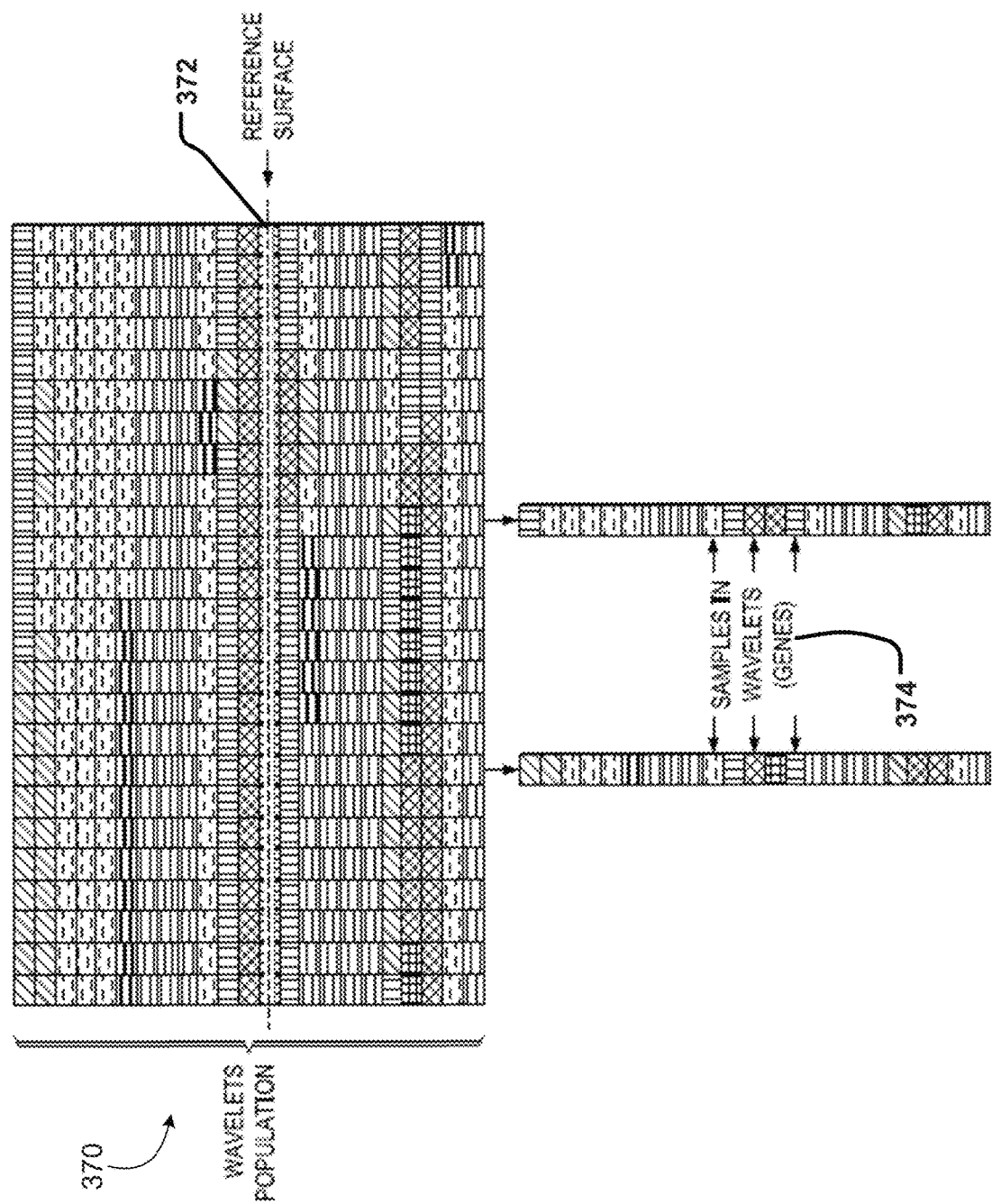
FIG. 8 depicts a wavelet population with a reference surface and genes (samples) in the wavelets.
Figure 9A:
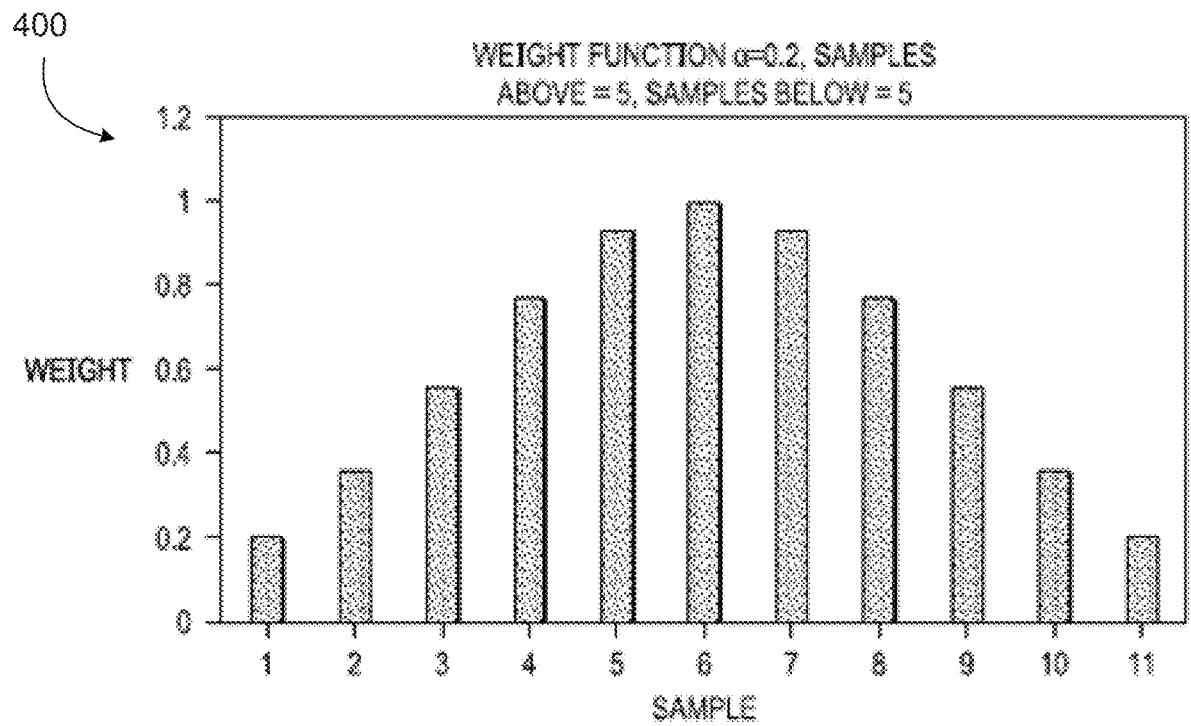
FIGS. 9A-9D depict example outcomes that show different choices of weight function.
Figure 9B:
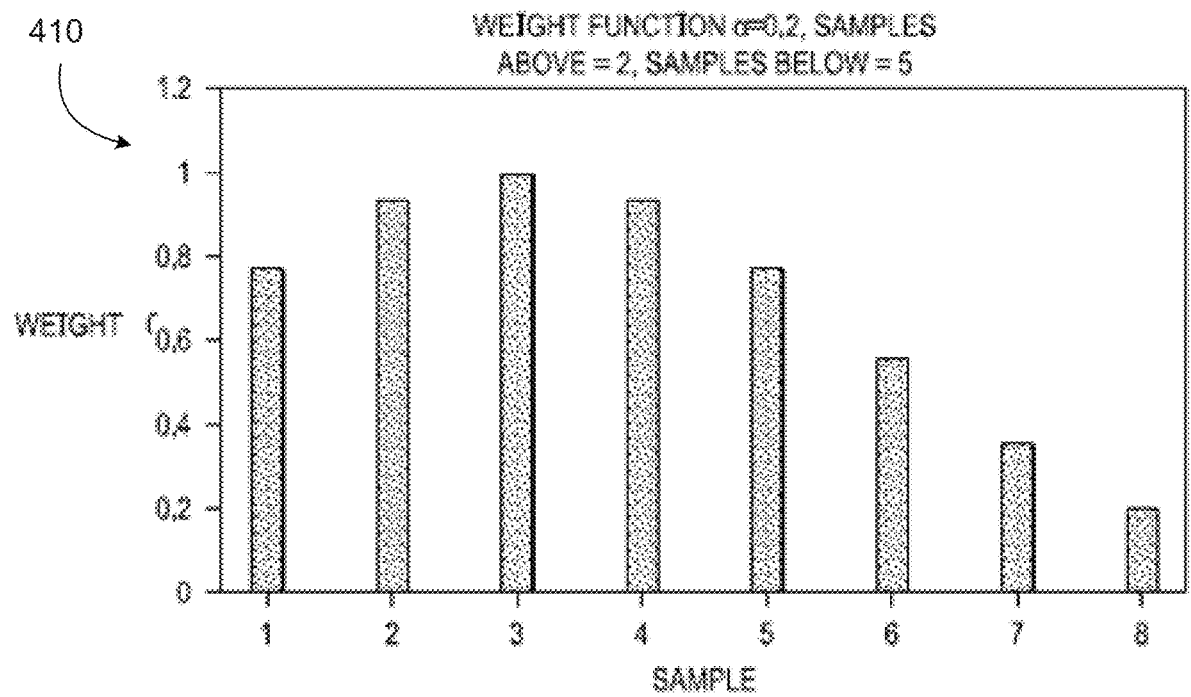
Figure 9C:
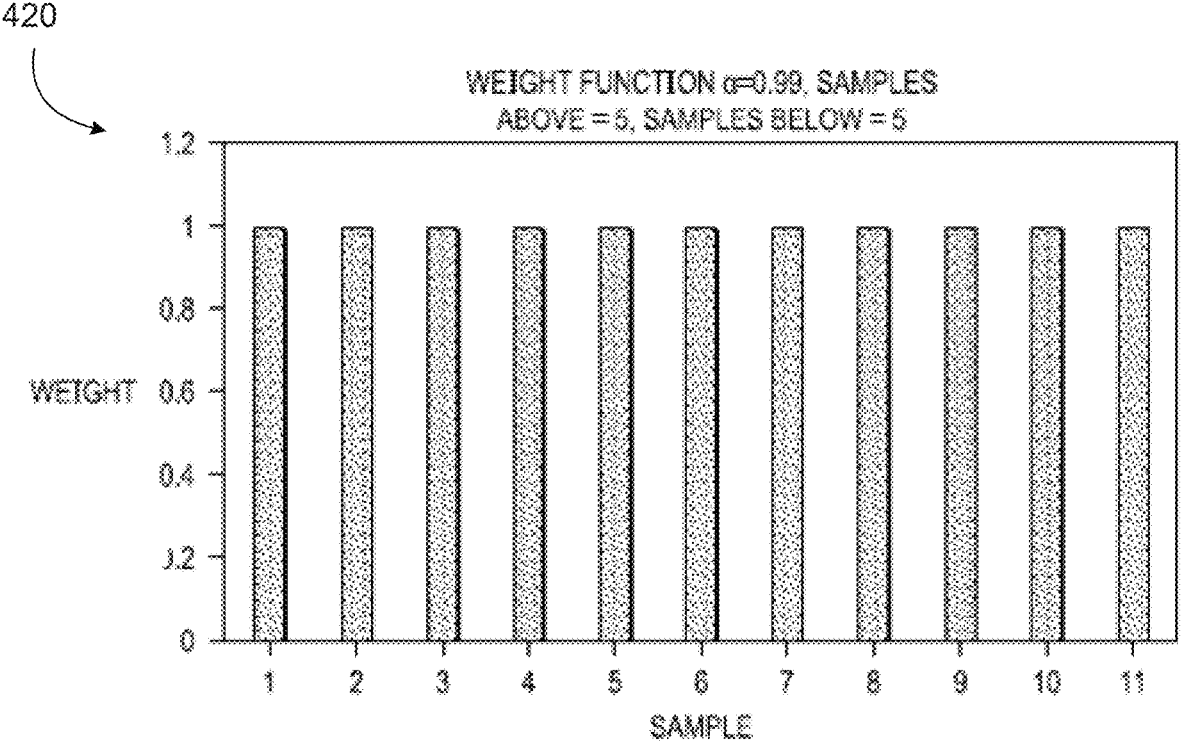
Figure 9D:
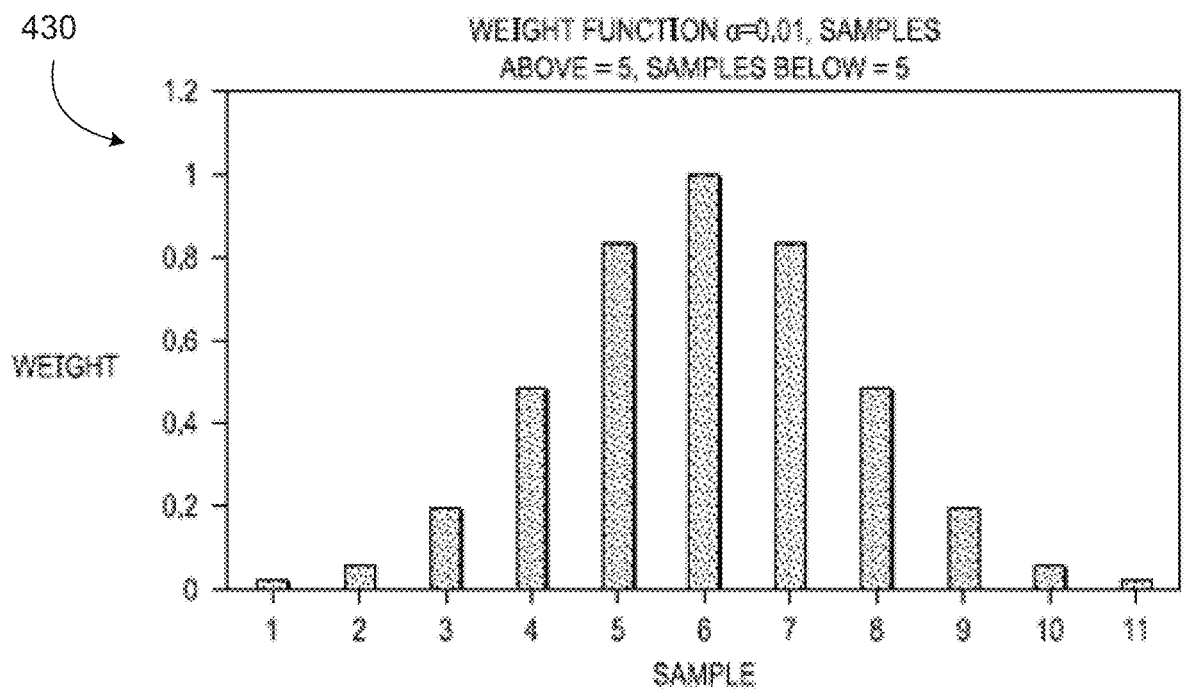

FIGS. 7A, 7B, and 8 depicts how the wavelets may be extracted along the picked surface). FIG. 7A depicts an example seismic section 350. FIG. 7B depicts an extracted population of wavelets 360. FIGS. 7A and 7B depicts how wavelets are extracted around a picked surface according to the number of samples both above and below the surface. Once these wavelets are extracted, they can be studied as a population of individuals with a global trend and individual differences. FIG. 8 depicts a wavelet population 370 with a reference surface 372 and genes (samples) in the wavelets 374. FIG. 8 shows how wavelets can be considered as individuals in a population each with multiple genes. The described system may compare these genes to corresponding genes in other wavelets and to the population trend.

Once the wavelets are extracted, a reference wavelet is determined at step 314. In some implementations, the reference wavelet is computed as the mean of all wavelets, where every gene (or sample) in the reference wavelet is the average of all corresponding samples (or genes) in the population of wavelets. In such implementations, the reference wavelet is therefore the same length as any other wavelet. This way the wavelets are then compared to the trend of the population.

During the initialization step 312, the weighting module 348 (see FIG. 6) determines global variables (at step 316) and functions (at step 315), such as the weight function that are employed in the output attribute map calculation. Such an initialization function can be defined according to:

```
Function initialize
   wL ← samples above + samples below + 1
   wavelets ← extract all wavlets as descriped in figure 1
   weights[wL] ← compute weights as descriped in table 1
   Wsum2 ← 0
   Wsum ← 0
   for sample 1 to wL
      Wsum2 ← Wsum2 + (weights[sample])²
      Wsum ← Wsum + weights[sample]
   end for
   referenceWavelet[all] ← 0 initialize all samples in reference
   wavelet to zero
   var[all] ← 0 initialize all samples in variance array to zero
   for each Y location
      for each X location
         for sample 1 to wL
            referenceWavelet[sample] ← referenceWavelet[sample]
                + wavelets[x, y, sample]
                   var[sample] ← var[sample]
                      + (wavelets[x, y, sample])²
         end for
      end for
   end for
   waveletsCount
   = XY wavelets count is total Y locations times total X locations
   for sample 1 to wL
      referenceWavelet[sample] ← referenceWavelet[sample]/waveletsCount
            var[sample] ← var[sample]/waveletsCount
            var[sample] ← var[sample] − (referenceWavelet[sample])²
   end for
   Rs ← 0
   std ← 0
   for sample 1 to wL
      Rs ← Rs + (weights[sample])(referenceWavelet[sample])²
            std = std + √var[sample]
   end for
```

$$Rs \leftarrow \frac{Rs}{Wsum}$$

$$std \leftarrow \frac{std}{wL}$$

function end

In the initialization function, the following are the inputs and outputs with their definition:

Input: seismic cube which is a 3D seismic data
Input: seismic surface which is a surface picked on the 3D seismic cube
Output: a set of weights. The number of weights are equal to the length as any of the wavelets.
Output: a set of wavelets which are extracted based on the seismic cube, seismic surface, samples above and samples below.
Output: a reference wavelet which is a single wavelet having the same length as the other wavelets.
Output: reference wavelet energy which is a single number.

The initialization function works as follows. The input module 346 receives a seismic cube, a seismic surface and the selection of a number of samples above, number of samples below and a weighting parameter α which is between 0.1 to 0.99. The wavelets as depicted in FIGS. 7A and 7B are extracted from the seismic cube, seismic surface and the samples above, samples below and extracts. The initialization function can also compute the set of weights according to the number of samples above, below and the parameter α which are user input. Once the weights are computed and the wavelets are extracted, the initialization function computes a single special wavelet which is called the reference wavelet. For anomaly identification, the reference wavelet is the mean of the population of wavelets although other ways of defining the reference wavelet are possible and some are described in this disclosure. Once the reference wavelet is computed, an energy characterization parameter (akin to wavelet energy) is computed from the reference wavelet. This parameter is similar to energy but is not exactly the energy of the reference wavelet since it is modulated by the weights. The weight modulation is useful to give the user the ability to assign different weights (or importance) to different samples (or genes) in the wavelets. By the end of the execution of the initialization function, the following intermediate outputs are available: wavelets population, reference wavelet, energy of the reference wavelet and the set of weights.

In some implementations, the weight function is calculated given the parameter α and number of samples above and below the surface. Such a weight function may be defined according to:

---

Function compute_weights; inputs: samples above, samples below, α; outputs weights[wL]
  wL = samples above + samples below + 1
  N = max(samples above, samples below)

$$v = -\frac{N^2}{2\ln(\alpha)}$$

for index = 1 → wavelet length
    d = |index − 1 − samples above|

$$\text{weights}[\text{index}] = e^{-\frac{d^2}{2v}}$$

end for
  return weights array
Function end

---

In the weight function, the following are the inputs and outputs:
Input: samples above
Input: samples below
Input: α
Output: array of weights. The number of weights is equal to the number of samples (genes) or the length of any wavelet.

The weights control how important each gene (or sample) in a given wavelet is compared to other genes in the same wavelet. A given weight is assigned to each gene and the same weight will be used on the same gene across all wavelets. The weight might not be the same for different genes in the same wavelet.

The weights are calculated one time at the beginning depending on a. The weights are independent of the actual data and are selected complete freely by the user. They are computed one time and then the same weights are applied on all wavelets. The purpose of the weights is to modulate the importance of each gene. The weights treat all wavelets the same way but do distinguish between different gene within a wavelet.

The weights are used to modulate the importance of each sample (gene). This is to give the user a way of specifying how important each gene is. The gene (or sample) at the surface intersection is always given a weight of 1 and this is the maximum weight possible. Depending on the selection of the α parameters, other genes could have any weight between almost 0 (not important) to almost 1 (equally important to the gene at the surface intersection). The weight of a given gene decrease the further away the given gene from the gene at the surface intersection. Each gene (or sample) is then multiplied by its weight during output creation to reflect its important or contribution to the final map. The weights are freely chosen by the user through the α parameter. FIGS. 9A, 9B, 9C and 9D show the resulting weights for various selection of α. They also show that the gene at the surface intersection is always given the maximum weight of 1 then the weight decrease in a rate that depends of α and the distance from the gene at the surface intersection.

There are geological and geophysical reasons for why the weights are needed or why different samples might have different weights or importance in the final output. The user might choose the weights depending on his/her understanding of the seismic cube, the seismic source and processing parameters, or the desired resolution of the final output.

Although the weighs are useful and not known to be used in similar systems, the system will still work even if the weights are not included at all. Not including any weights is equivalent to assigning the same weights to all genes (or samples) or assigning α to be 0.99. Providing the weight function, however, gives the user more options and control over the output depending on his/her understanding of the original seismic cube.

FIGS. 9A-9D depict example outcomes 400, 410, 420, and 430 respectively that show different choices of weight function. In some implementations, the sample at the surface intersection has a weight of one, which is the maximum weight but it might not be in the center. Also, when α decreases more relative, weight is given to the sample at a surface intersection and when α approaches one, weights become equal for the samples, which is equivalent to not using the weight function At step 320, the map module 350 (see FIG. 6) generates a surface attribute map by generating a value for each spatial location. Each spatial location (for example, coordinates defined in terms of x, y or inline, crossline) may have a real number as the value of the attribute. In some implementations, the real number can be calculated as a 2D array of real numbers as follows:

```
Function compute_output_map
    for each Y location
        for each X location
            OutputMap[x, y]← abnormalityMeasure(wavelet[x, y],
                referenceWavelet)
        end for
    end for
    return outputMap
function end
```

This function computes the output. Here are the inputs and outputs:
Input: population of wavelets
Input: the reference wavelet
Output: 2D array of numbers each number at a given x,y is generated by the abnormality measure between the wavelet at that location and the reference wavelet.

The compute output function loops over all the wavelets and compares each wavelet at a given x, y to the reference wavelet to get a number and assigns that number to the x, y location of the wavelet. The actual abnormality measure is described in the next function that is the abnormality measure function. Once this loop finishes the output is 2D array of numbers that can then be viewed as a map. Once the map is generated, a geophysicist or geologist can easily interpret it because geological features will be highlighted in it (see FIGS. 10A-10C, 11A, and 11B for examples).

At step 316, the anomaly module 352 (see FIG. 6) calculates the abnormality measure. In some implementations, the abnormality measure is a custom function to quantify the abnormality between the current wavelet under investigation. This custom abnormality measure can be calculated given two wavelets. For example, the custom abnormality measure can be calculated at 322 as follows:

```
Function abnormalityMeasure(wavelet, referenceWavelet)
    nR ← 0
    Ws ← 0
    for sample 1 to wavelet length
        nR← nR
            + (weights[sample])² (wavelet[sample])(referenceWavelet[sample])
        Ws←Ws + (weights[sample])(wavelet[sample])²
    end for
```

$$Ws \leftarrow \frac{Ws}{Wsum}$$

$$nR \leftarrow \frac{nR}{Wsum2}$$

$$abnormalityMeasure \leftarrow \left(\frac{Ws}{Rs}\right) \bullet \text{Sign}(nR) \bullet \left(\frac{1-nR}{std}\right)$$

```
    return abnormalityMeasure
function end
```

This function measured the difference between a given wavelet and the reference wavelet. Input and output are as follows:
Input: a wavelet
Input: population of wavelets
Output: a single number representing the abnormality measure This function takes one wavelet and the trend of the population of wavelets and produces a number that is a quantitative measure of how anomalous the specific individual wavelet relative to the population of wavelets. The exact calculation is given in the function table above. Qualitatively speaking, each gene (sample) in the given wavelet is compared to the corresponding gene in the reference wavelet where the reference wavelet is the trend (for example, the average) of the wavelets in the population of wavelets and multiplied but its weight squared. The weight controls how important the gene is in the final abnormality score. There are also other considerations apart from the genes and the weights. For example, two measures of a custom quantity akin to wavelet energy are used here to amplify or reduce the abnormality output according to its significance. Ws is a custom measure of wavelet energy (it is not exactly wavelet energy because it is modulated by the weights) and Rs is a custom measure of reference wavelet energy. The role of these two quantities is to decrease the abnormality measure if the current wavelet energy is much less than the reference wavelet energy because it is deemed insignificant. The abnormality measure will be increased if the current wavelet energy is more than the reference wavelet energy because it is deemed significant. All these factors together produce a custom measure of how anomalous the specific individual wavelet relative to the population of wavelets as a single number. This single number is returned as the output of this function.

The parameter "std" is however similar to standard deviation in the sense that it gives a measure of the spread. However, the parameter "std" is not actually the variance or the standard deviation of the wavelet population because, in their formal definitions, the variance or the standard deviation is calculated assuming that every item have the same weight as every other item. In the previously described algorithm, a custom weight function is chosen by the interpreter (user) to reshape the wavelets before calculating the spread giving different samples different weights (importance). The weight function actually serves very important purpose specific to seismic data which is to allow the interpreter (user) to incorporate information he/she knows or assumes about the phase of the seismic source after processing is done (zero phase vs minimum phase, etc.) and the vertical resolution. In this approach, the parameter "std" is not exactly the standard deviation of the original wavelets but it is akin to it because it is run on the wavelets after they are reshaped and their different samples given weights.

The spread (std) is not of a given wavelet (not calculated across the samples of a given wavelet) but is the spread of each sample across the population of wavelets. So for each sample there is a global std measure. The overall std of the population (which is used in the formula at the end) then is the weighted average of the std of all samples. the STD of more important samples will affect the overall STD more than less important ones.

The normalizing by the spread (of the population as whole) is very significant to the abnormality measure function. If the spread of the whole population is small, then the population is very coherent and close to its mean and any deviation by a given wavelet will be of high significance and means this wavelet is very abnormal. If the spread of the population is very high, this means the population is not coherent and any deviation from the mean should not be taken as that unusual. For this reason, the abnormality measure should be normalized by the spread of the population. This is akin to the statistical sigma significance tests.

Calculation of the abnormality measure includes multiplication by Sign(nR). This sign is very important in the case of seismic data interpretation because it is significant to know if a given deviation from the mean is in phase with the mean (correlation coefficient positive) or in opposite phase with the mean (correlation coefficient negative). This approach preserves the sign that indicates in phase and opposite phase deviation. In the case of seismic data, it matters a lot if a given wavelet has the opposite phase compared to the mean even if it is not far away from the mean. Multiplying by the sign then allows for the assignment of negative values for abnormalities that have opposite phase compared to the mean and positive values for abnormalities that have the same phase as the mean.

At step 330, the surface attribute map along the input surface may be employed to provide, for example, a spatially global assessment and quantification of the seismic surface abnormality. The value of the surface attribute on this map may provide a way to assess the abnormality. Areas with an anomalous may highlight stratigraphic features, such as channels, faults and sand bodies. The described process 100 provides a global measure of abnormality and features as opposed to, for example, texture attributes that work within a window and are local.

Figure 10A:
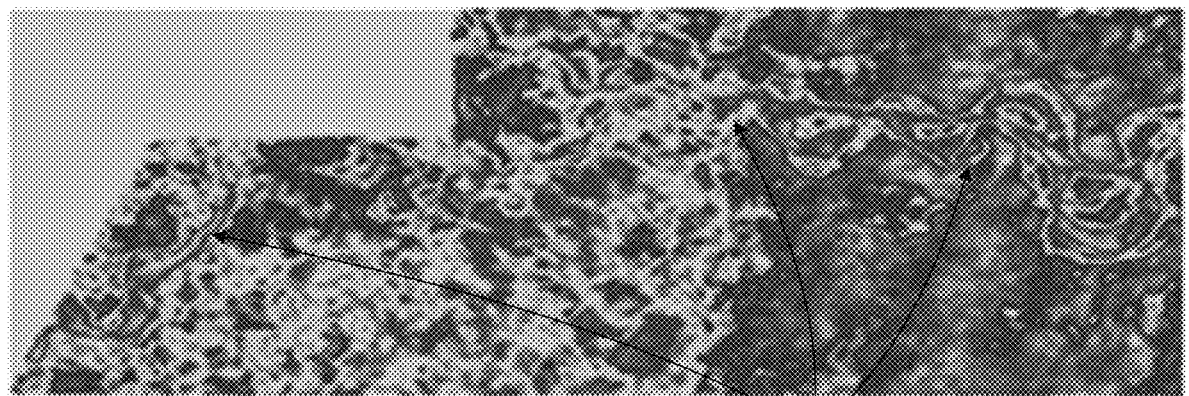
FIGS. 10A-10C depicts example slice data.
Figure 10B:
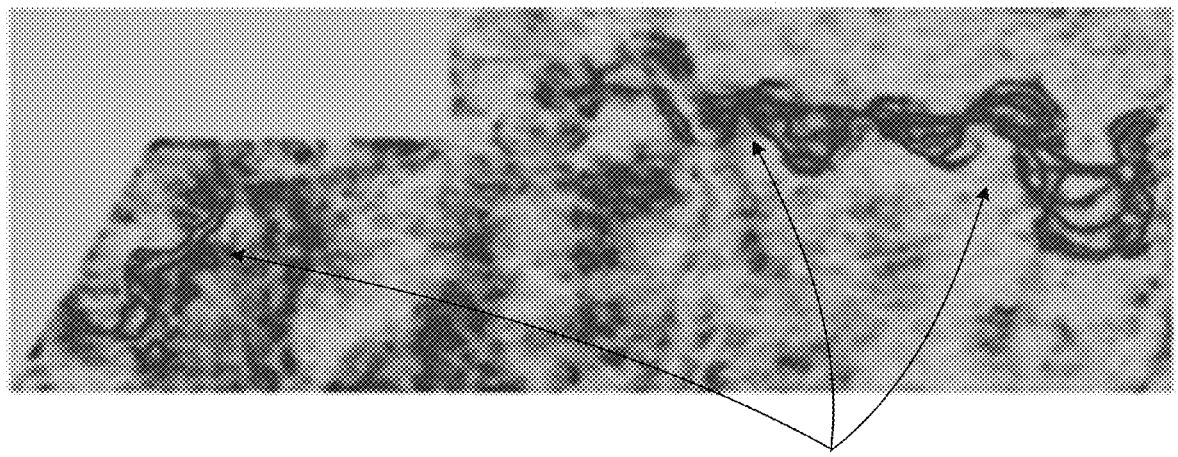
Figure 10C:
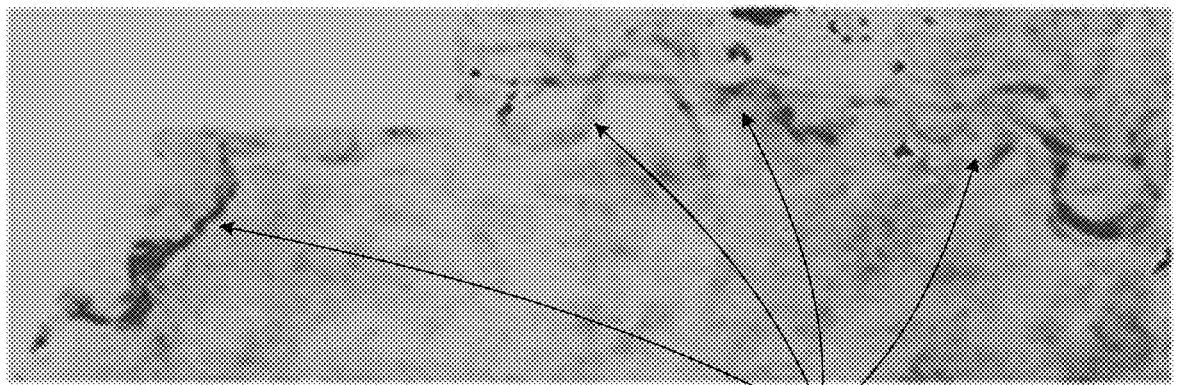

The output map can be used to highlight stratigraphic and dispositional features such as channels and faults. In tests runs, this approach sometimes shows features that are not previously visible or produce a better image of features that are hardly visible using other techniques. The detectability of these features increases, making it easier for an interpreter to find and map them. Several examples on real data are provided next. The key subterranean feature in this formation is channel 450. In FIGS. 10A-10C, the channel 450 is most visible and continuous on the map (10C) compared to original seismic data (10A) or the results of the spectral decomposition technique that is the technique most commonly used for channel detection (10B).

Both the abnormality-based approach described in this specification and pick-quality based approaches have the potential of detecting stratigraphic features but do not detect every stratigraphic feature with the same quality. The visibility of a specific feature depends on the specific geological deposition and settings of the feature and how it compares to the rest of the reflector. Some features will show better on the quality attribute and others will show better on the mutation attribute. Some stratigraphic features are more visible on attribute maps developed using abnormality-based approach described in this specification and some stratigraphic features are more visible on attribute maps developed using pick-quality based approaches. For example, sometimes a channel is coherent with the reset of the reflector and sometimes it is anomalous. For this reason, each approach will detect different features on different data sets.

Figure 11A:
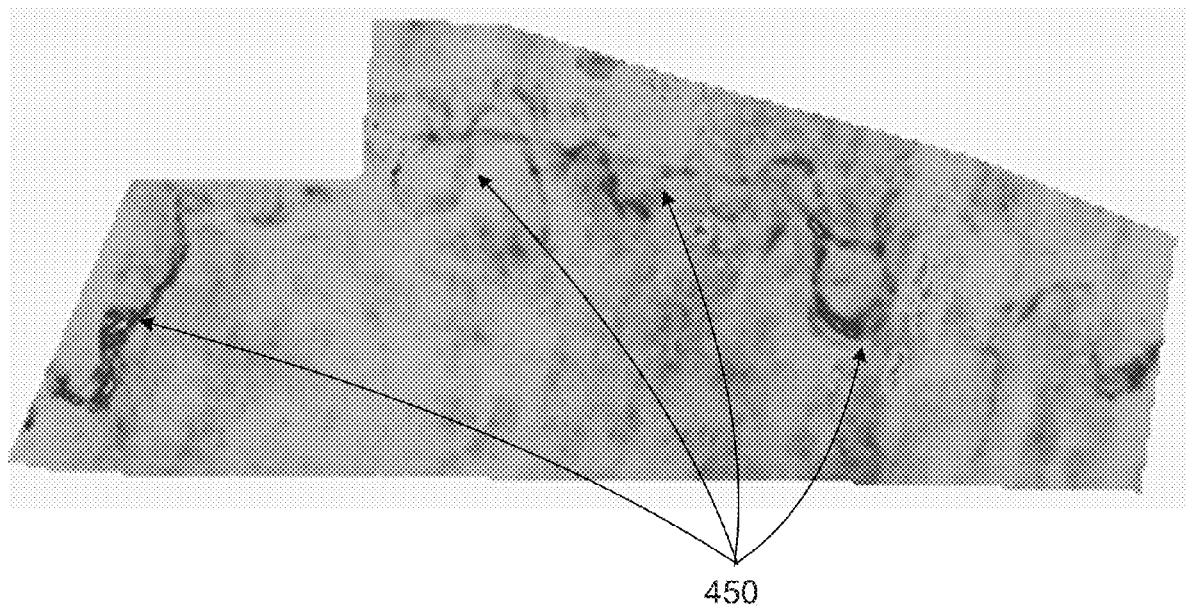
FIGS. 11A and 11B show the difference between results obtained using the abnormality-based approach described in this specification (FIG. 11A) and using a pick-quality based approach (FIG. 11B).
Figure 11B:
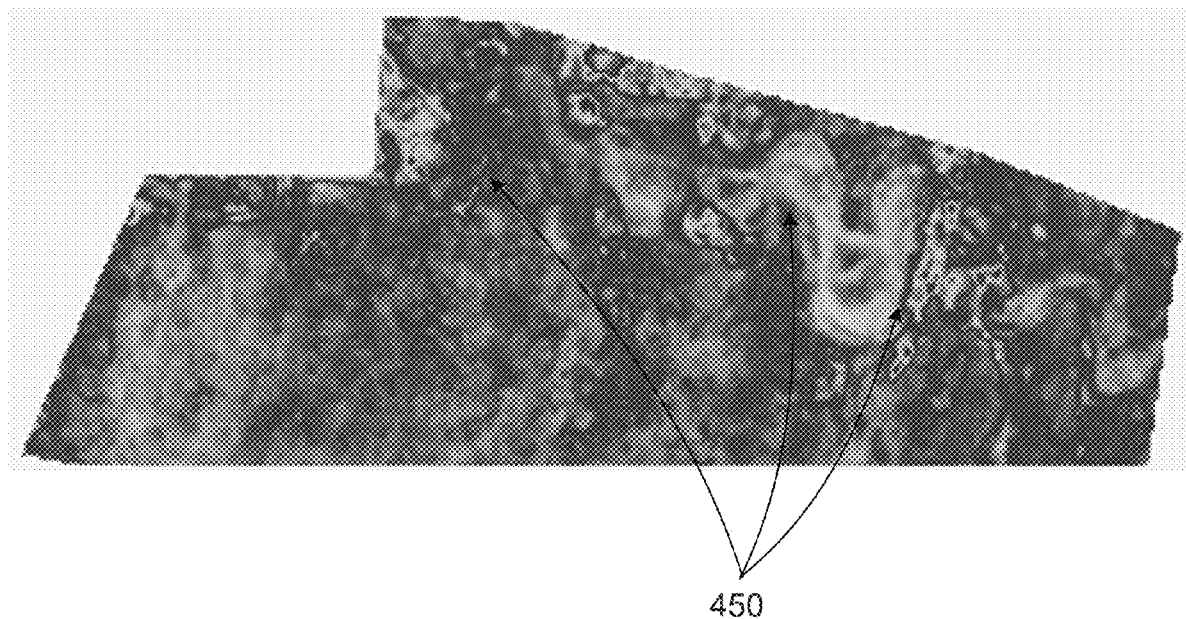

FIGS. 11A and 11B show the difference between results obtained using the abnormality-based approach described in this specification (FIG. 11A) and using a pick-quality based approach (FIG. 11B). Both channels and faults highlighted on the map generated by these approaches when run on real data. Stratigraphic and depositional features are detected because this process detects subtle variations in the seismic wavelets, which could arise from such depositional features. The channel 450 and its individual branches are most clearly visible in results obtained using the abnormality-based approach described in this specification (FIG. 11A).

Figure 12:
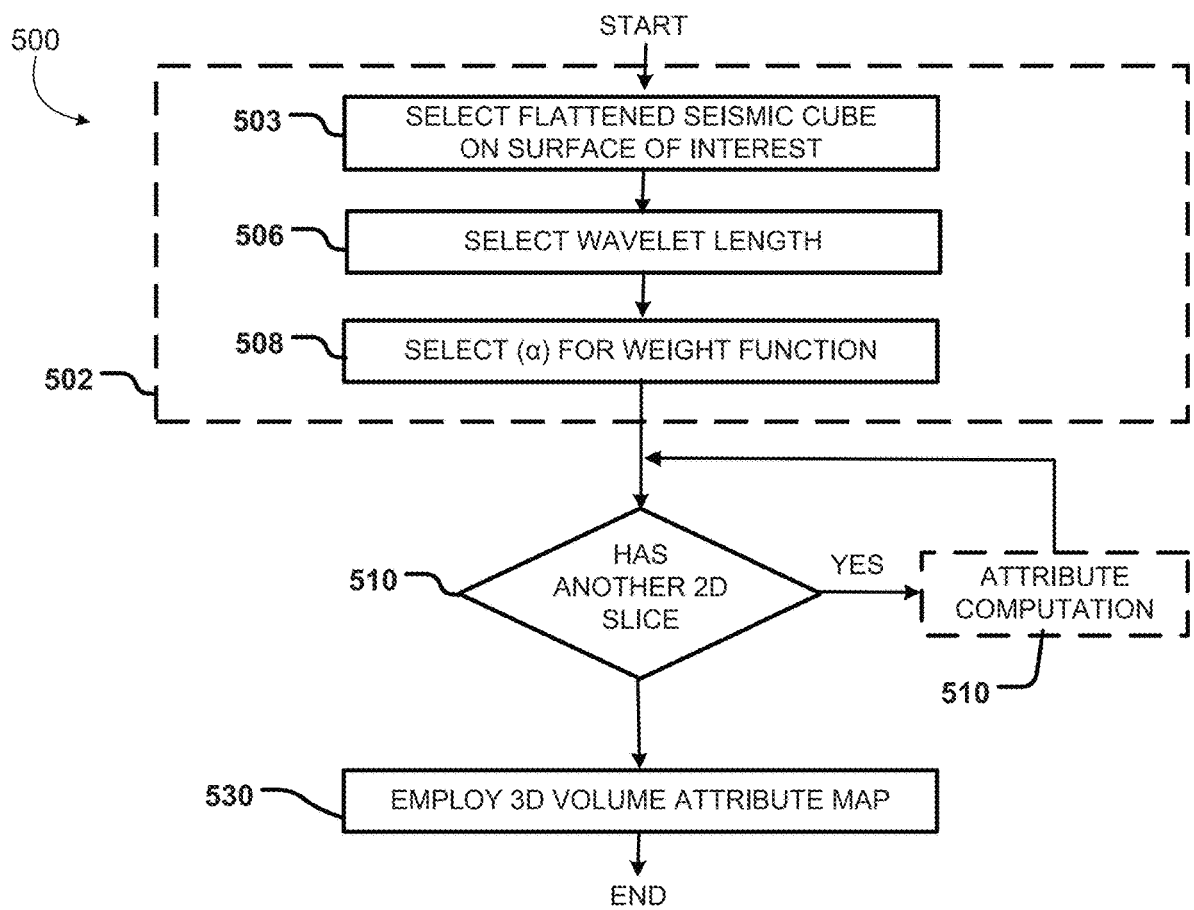
FIG. 12 depicts a flow diagram of an example process employed to generate a three-dimensional (3D) volume attribute.

FIG. 12 depicts a flow diagram of an example process 500 employed to generate a 3D volume attribute according to implementations of the present disclosure. The example process 500 is similar to process 300 depicted in FIG. 5. The select attribute parameters step 502 includes steps 503, 506, and 508 and is substantially similar to the select attribute parameters step 302 of FIG. 1. The wavelets length is determined at 506 (similar to step 306) and a parameter reference is selected as (α) for a weight function at 508 (similar to step 308). At 503, however, the input seismic cube is flattened on the surface of interest. Once the cube is flattened, each horizontal 2D slice on the cube can be considered as a 2D surface along which the algorithm is run. In some implementations, there is no need for a surface selection for process 500 (step 304 of FIG. 1). Each horizontal slice in the input cube (510) is proved as input to the attribute computation step 110 of FIG. 1 to generate a corresponding 2D slice. Repeating for all horizontal slices in the input cube, a 3D volume attribute is generated as output. This part (shown in FIG. 5) describes a way of extending the process from producing 2D surface attribute maps as its final output to producing a 3D volume as 3D volume attribute. This approach can produce 3D volumes as output by flattening the original cube on the surface of interest then taking the 2D slices that compose the flattened 3D input cube one by one producing 2D slice each time then combining all the 2D slices to produce the final output as a 3D cube. In some implementation, the generate weight function step 315 can be implemented once and used for each horizontal slice in the input cube. At 530, the 3D volume attribute may be employed to evaluate the depositional features above and below the surface of interest.

The 3D volume can allow the interpreter to examine and explore the depositional features above and below the surface of interest not only on the surface and make it possible to look for these features in 3D space not only as a 2D map. This approach increases the likelihood of discovering those features that do not happen exactly on the surface but just above or below it. For example, if a channel is present above or below the surface of interest the interpreter will still be able to discover it using a 3D output even though the channel is not on the surface of interest. The use cases are similar to the 2D attribute map. The interpretation of the result 3D is the same as that of 2D but in 3D space.

Figure 13:
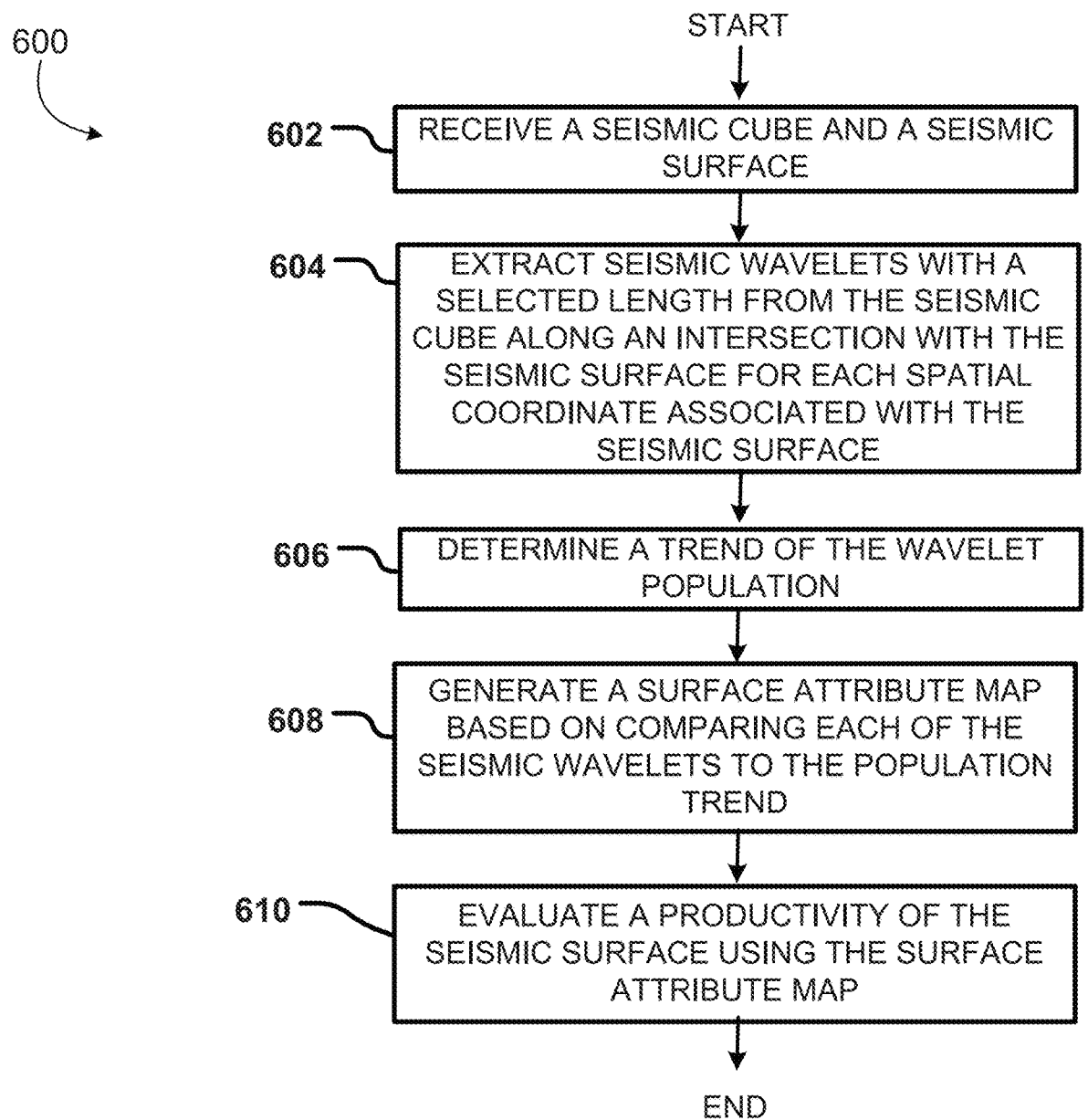
FIG. 13 depicts a flow diagram of an example process to generate a custom seismic surface and volume attribute that can be employed in seismic exploration for hydrocarbons.

FIG. 13 depicts a flow diagram of an example process 600 to generate a custom seismic surface and volume attribute that can be employed in seismic exploration for hydrocarbons. At 602, a seismic cube and a seismic surface is received, and the seismic cube includes traces recorded at receivers deployed to collect seismic data. Seismic wavelets are extracted with a selected length from the seismic cube along an intersection with the seismic surface for each spatial coordinate associated with the seismic surface (step 604). A population trend of the wavelet population is determined (step 606). A surface attribute map is generated based on comparing each of the seismic wavelets to the population trend (step 608). A productivity of the seismic surface is evaluated using the surface attribute map (step 610).

Figure 14:
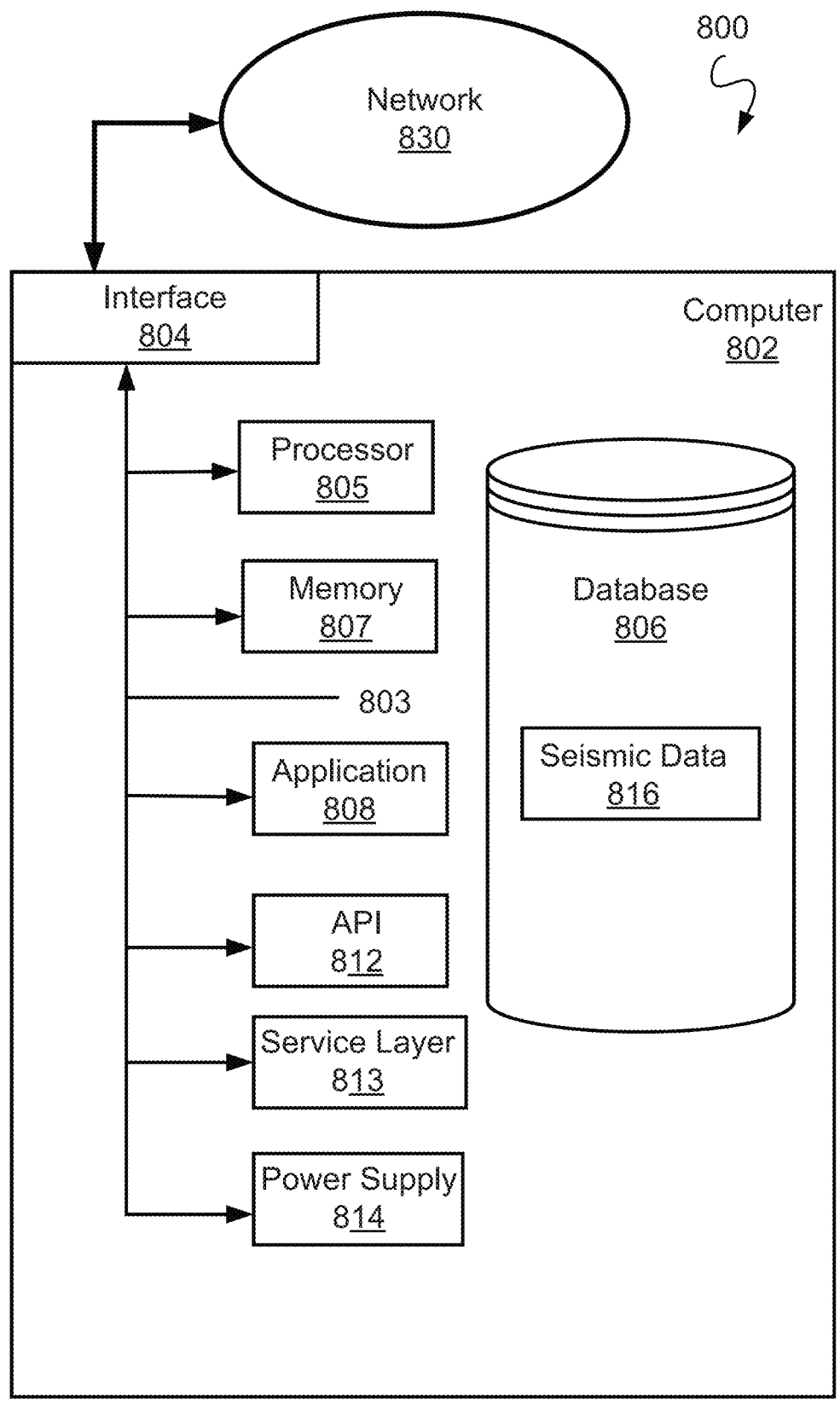
FIG. 14 is a block diagram illustrating an example computer system used to provide computational functionalities associated with described algorithms, methods, functions, processes, flows, and procedures as described in the present disclosure, according to some implementations of the present disclosure.

FIG. 14 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a high level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either useror non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various FIGS. may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for identifying anomalies in a subterranean formation, the method comprising:
    receiving a seismic cube and a seismic surface, wherein the seismic cube includes traces recorded at receivers deployed to collect seismic data, and the seismic surface is picked on the seismic cube;
    extracting, by an anomaly identification (ID) engine, data representing seismic wavelets with a selected length from the seismic cube along an intersection with the seismic surface for each spatial coordinate associated with the seismic surface;
    computing, using a weighting module of the anomaly ID engine, a reference wavelet based on an initialization function applied, by the weighting module, to the data representing the seismic wavelets;
    generating, by the anomaly ID engine, a multi-dimensional array of numbers based on a mapping function of a mapping module that receives the reference wavelet as an input, wherein each number in the multi-dimensional array is an abnormality measure between the reference wavelet and each seismic wavelet; and
    generating, by the mapping module, an attribute map that identifies the anomalies in a subterranean formation based on the abnormality measure between the reference wavelet and each seismic wavelet.

2. The method of claim 1, further comprising determining weights for each of 2D slice or sample of the wavelets, wherein the wavelets are extracted using the weights.

3. The method of claim 1, further comprising, before extracting the wavelets, determining a wavelet length for the selected seismic cube, wherein the wavelet length represents a number of genes in each of the extracted wavelets.

4. The method of claim 3, wherein the wavelet length is the same for each of the extracted wavelets.

5. The method of claim 3, further comprising selecting a parameter reference for the weight function to give weights to each of the genes.

6. The method of claim 5, wherein the parameter reference is between 0.1 and 0.99.

7. The method of claim 3, wherein the attribute map displays the abnormality measure.

8. The method of claim 7, the abnormality measure is generated by comparing each gene in a given wavelet to a corresponding gene in a population trend corresponding to the reference wavelet.

9. The method of claim 7, comprising calculating wavelet energy modified by the weights and energy of the population trend modified by the weights.

10. The method of claim 9, comprising decreasing the abnormality measure if the current wavelet energy is less than the energy of the population trend and increasing the abnormality measure if the current wavelet energy is more than the energy of the population trend.

11. The method of claim 10, comprising normalizing the abnormality measure by a spread of each sample across a population of wavelets.

12. The method of claim 11, wherein generating the abnormality measure comprises multiplication by Sign(nR) to determine a phase of a deviation characterized by the abnormality measure.

13. The method of claim 1, comprising evaluating a productivity of the seismic surface using the surface attribute map.

14. One or more non-transitory computer-readable storage media coupled to one or more processors and having instructions stored thereon which, when executed by the one or more processors, cause performance of operations comprising:
    receiving a seismic cube and a seismic surface, wherein the seismic cube includes traces recorded at receivers deployed to collect seismic data, and the seismic surface is picked on the seismic cube;
    extracting, by an anomaly identification (ID) engine, data representing seismic wavelets with a selected length from the seismic cube along an intersection with the seismic surface for each spatial coordinate associated with the seismic surface;
    computing, using a weighting module of the anomaly ID engine, a reference wavelet based on an initialization function applied, by the weighting module, to the data representing the seismic wavelets;
    generating, by the anomaly ID engine, a multi-dimensional array of numbers based on a mapping function of a mapping module that receives the reference wavelet as an input, wherein each number in the multi-dimensional array is an abnormality measure between the reference wavelet and each seismic wavelet; and
    generating, by the mapping module, an attribute map that identifies the anomalies in a subterranean formation based on the abnormality measure between the reference wavelet and each seismic wavelet.

15. The computer-readable storage media of claim 14, the operations further comprise: determining weights for each of 2D slice or sample of the wavelets, wherein the wavelets are extracted using the weights.

16. The computer-readable storage media of claim 14, the operations further comprise: before extracting the wavelets, determining a wavelet length for the selected seismic cube, wherein the wavelet length represents a number of genes in each of the extracted wavelets.

17. The computer-readable storage media of claim 14, wherein the attribute map displays the abnormality measure.

18. The computer-readable storage media of claim 17, wherein the abnormality measure is generated by comparing each gene in a given wavelet to a corresponding gene in a population trend corresponding to the reference wavelet.

19. The computer-readable storage media of claim 18, the operations further comprise: calculating wavelet energy modified by the weights and energy of the population trend modified by the weights.

20. The computer-readable storage media of claim 18, the operations further comprise: decreasing the abnormality measure if the current wavelet energy is less than the energy of the population trend and increasing the abnormality measure if the current wavelet energy is more than the energy of the population trend.

21. The computer-readable storage media of claim 20, the operations further comprise: normalizing the abnormality measure by a spread of each sample across a population of wavelets.

22. The computer-readable storage media of claim 14, the operations further comprise: evaluating a productivity of the seismic surface using the surface attribute map.

* * * * *